Aug. 26, 1947.  A. V. DE FOREST  2,426,390
STRAIGHTENING APPARATUS
Filed Nov. 17, 1944  2 Sheets-Sheet 1
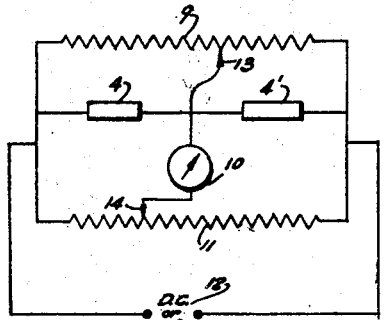
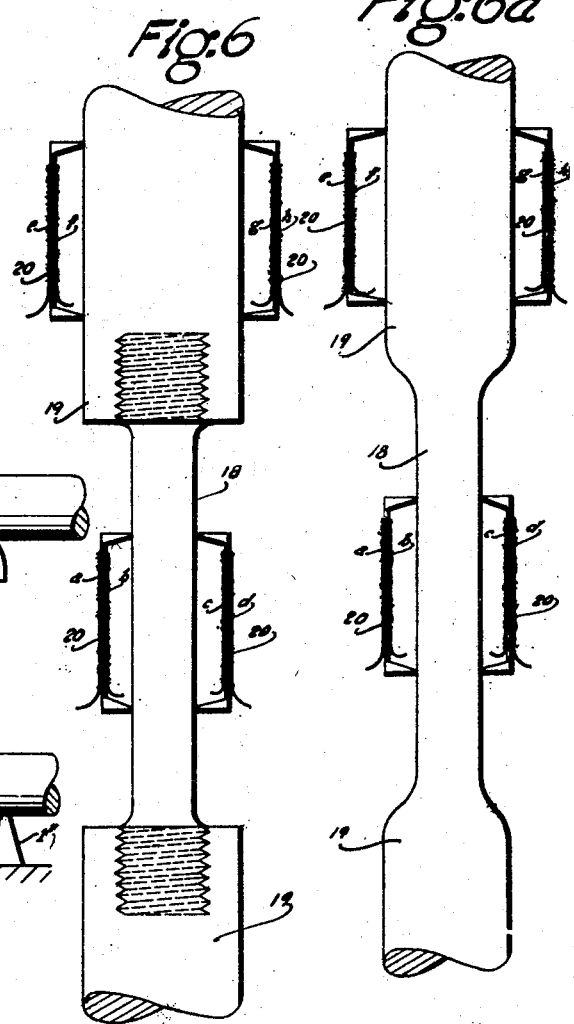
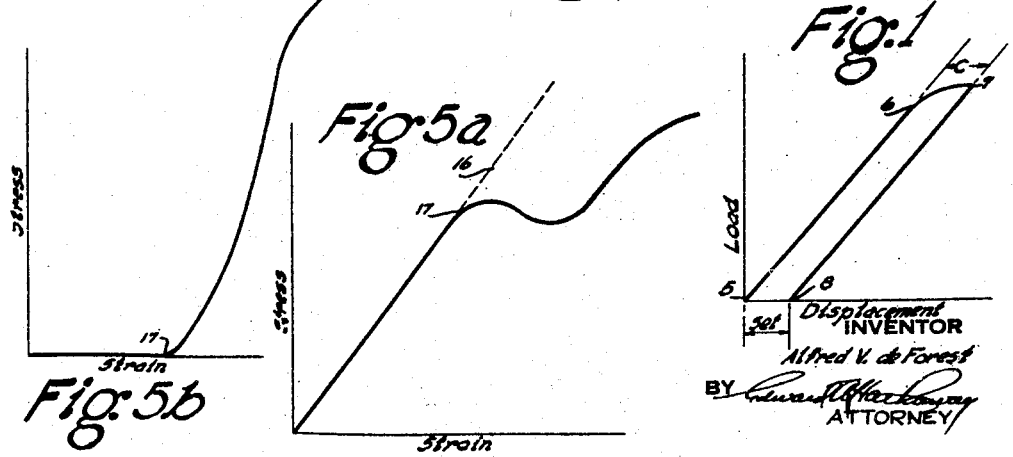
INVENTOR
Alfred V. de Forest
BY
ATTORNEY

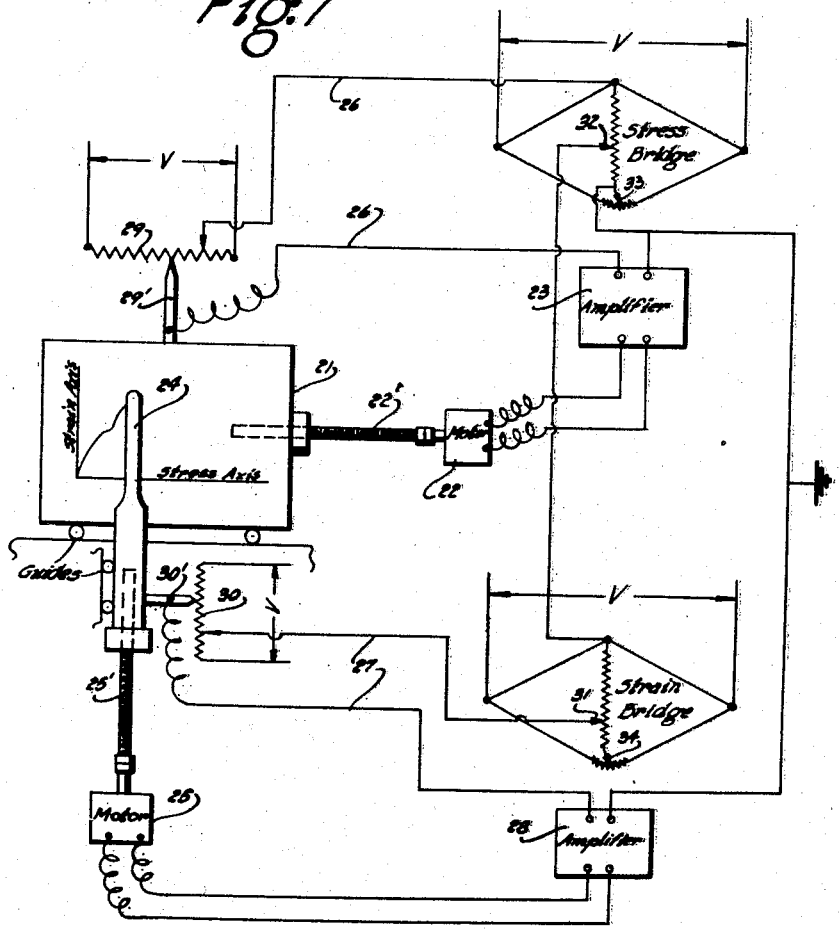

Patented Aug. 26, 1947

2,426,390

UNITED STATES PATENT OFFICE 2,426,390

STRAIGHTENING APPARATUS

Alfred V. de Forest, Marlboro, N. H., assignor to The Baldwin Locomotive Works, a corporation of Pennsylvania Application November 17, 1944, Serial No. 563,931

2 Claims. (Cl. 153—32)

This invention relates generally to materials testing and processing, and more particularly to apparatus for measuring or utilizing what is known as deviation from proportionality in the relationship between load and strain, load and deflection, or stress and strain, torque and twist, etc.

The factors of stress and strain are usually autographically recorded or manually plotted in the form of the well-known stress-strain diagram and autographic recorder equipment for such purpose has been highly developed and in wide use. However, another relationship between stress and strain, namely, deviation from proportionality, has long been known and used but the diagram for the same has been effectively produced only by a very laborious method of manual plotting. Nevertheless, there are many practical problems involving the use, shop handling, and testing of metallic and non-metallic materials where the deviation from proportionality in the relationship between the above functions of load and strain, etc., provides information of great value both technically and commercially. For instance, in materials testing a certain percentage of deviation from proportionality is frequently specified as representing the yield strength particularly with certain types of non-ferrous metals or with heat treated alloy steels having no reasonably definite yield point. On the other hand, in straightening or bending a pipe, engine crankshaft, heat treated rod or other material, the operation is usually performed by guessing or by a mere visual and uncontrolled procedure as will be explained later although in some instances the amount to which a member must be deformed to straighten or bend it has been mathematically determined by deviations from proportionality. All of these operations and uses as heretofore based on such proportionality curve involved tedious manual or mental operations that by their complexity are slow and therefore undesirable except in compelling situations.

It is one object of my invention to provide improved apparatus for utilizing or measuring the critical features of the above-mentioned relationships rather than the relationships themselves.

Another object is to provide an improved apparatus for utilizing or measuring the deviation from linearity in a simple, direct and positive manner with a high degree of accuracy, sensitivity and responsiveness.

In accomplishing the foregoing, I have broadly provided electrical sensitive means responsive to the individual components of the relationship in question and also means for directly obtaining the divergence of that relationship from linearity. In the preferred embodiment of my invention I make use of bonded wire strain gages as the sensitive elements, although I can equally well use any other well-known elements which are electrically responsive to load, strain, deflection, etc., such as electromagnetic gages of various types, capacity type gages, carbon pile gages, carbon strip gages; in fact, any device whose electrical impedance varies with the quantity involved.

Other objects and advantages will be more apparent to those skilled in the art from the following description of the accompanying drawings in which:

Fig. 1 is a load-displacement curve;

Fig. 2 is a diagrammatic illustration of my invention applied to a pipe or rod straightening operation;

Fig. 3 is a wiring diagram of a responsive circuit that may be employed with my pipe straightening operation;

Fig. 4 is a curvature gage that may be employed for determining the straightness of a shaft or the like in accordance with the principles of my invention;

Fig. 5a illustrates a conventional plot of stress against strain;

Fig. 5b illustrates how the above stress-strain curve can be recast to show only the deviations from a modulus line specifically showing deviations of strain;

Fig. 6 is a weigh bar and extensometer adapted to be employed in my improved combination of elements;

Fig. 6a is an integral weigh bar and specimen; and

Fig. 7 is a diagrammatic arrangement of mechanisms for producing a stress-strain diagram of the type shown in Fig. 5b.

In order to appreciate the significance of my improved apparatus, I have shown in Fig. 1, by may of simple illustration, a load displacement curve which is characteristic of a great many materials, notably metals. Fig. 1 may, for example, represent the load displacement curve which would be obtained in a straightening or bending press under operating conditions and Fig. 2 shows schematically the mechanism and factors involved in the straightening operation. The piece or specimen 1 to be straightened or bent is supported on the bed of a press through a pair of usual transverse supports or rests 1'. A piston or ram 2 exerts a force or load to bend the specimen while a deflection measuring device 3 measures the deflection of the specimen, or the out-of-straightness thereof if the latter is rotated on fixed supports or centers. The deflection device may be of any suitable type but it is specifically shown as having a flexible beam 3', one end being secured to a fixed base and the other end having a point contact with the specimen at any desired part thereof. For convenience, I have shown strain-sensitive bonded wire gages 4 and 4' on members 2 and 3 respectively for the purpose of measuring the load and deflection, although as above stated any other electrically responsive devices would serve the same purpose.

Considering Fig. 1 to represent the relation between load and displacement, or deflection, of the arrangement shown in Fig. 2, it is known that if the loading starts at 5 and is progressively increased, a substantially linear relationship holds up to a more or less indefinite point 6, beyond which the relation deviates from linearity along some such path as 6 to 7. If now the load is removed at 7 and reduced to zero it is characteristic of many materials that the deflection will return to a point 8, such that the "permanent set" between points 5 and 8 is very nearly equal to the curvature offset C. Where this is not quite true, it is a simple matter to determine experimentally the relation between the two quantities.

The load displacement characteristic of Fig. 1 can thus be used to advantage in such operations as straightening, since it is quite practical to measure offset C as the loading, or straightening process, proceeds, without having to remove the load. Suppose, for example, that the out-of-true of member 1 has been determined by rotating the member and observing the output of deflection pickup 3; the out-of-true is found by taking one-half of the total reading so obtained. Now if load is applied until offset C in Fig. 1 is equal to the out-of-true of member 1, it will be found that the member will be straight and true when the load is removed. In some instances it may be necessary to repeat the process to obtain perfect straightness but with a little practice on the material and member involved the work can be done very expeditiously by my method.

In present practice the straightening is done by a process of trial-and-error in which there is little or no direct control of the amount of straightening being done. My invention makes direct control possible and does so by simple and easy-to-operate means.

In a further embodiment of my invention I provide means for measuring or utilizing directly the curvature offset C which avoids the necessity for having a plot such as Fig. 1. To accomplish this, I oppose gage 4 against gage 4' in a bridge circuit so that the bridge remains balanced over the elastic or linear range, as from 5 to 6 in Fig. 1. Under this condition, the unbalance of the bridge will then read the offset C directly without the necessity of plotting load against deflection. As an example of such a bridge I have shown Fig. 3, it being understood that many other circuits may be employed for the purpose without departing from the spirit of my invention.

In Fig. 3, responsive elements 4 and 4' comprise adjacent arms, being shunted variably by contact 13 acting on resistance 9. Resistance 11 is divided by contact 14 to form the other two bridge arms, while 10 is a well known voltmeter serving as an unbalance indicator and 12 is a source of D. C. or A. C. power. Contact 13 may be set so that the effects of 4 and 4' exactly cancel each other within the linear range of member 1; this is easily seen from the fact that the shunt resistance around 4 goes up while that around 4' goes down. Contact 14 serves to balance the bridge as a whole without changing the proportionality setting of contact 13. In operation, the contacts 13 and 14 are set so that the bridge is balanced and remains balanced as the load is varied within the linear range. To perform the straightening operation the load is then increased until the unbalance indicator 10 shows that the desired permanent set has been achieved.

Instead of simply indicating the permanent set, the unbalanced voltage may automatically control the operation of the press so as to release the applied load. For instance, an adjustable electrical contact 10' can be positioned anywhere around the circumference corresponding to the degree of unbalance and deflection required for a given correction by the applied load. Closure of this contact by the hand of instrument 10 will reverse a usual and well-known reversible pump, or of a main valve, of a hydraulic press, thereby to relieve the load.

One particular advantage of my invention, not hitherto attained by other means, will be seen from the following considerations. It is known that if an originally bent shaft is straightened by cold bending in a single operation, an unbalanced internal stress is produced leaving compression on the original concave side, and tension on the convex side. Such residual stresses will tend to cause the shaft to again become bent under the action of small repeated loads. To correct this situation the proper procedure is to overbend the part by an amount slightly less than the original out-of-straightness, and to reduce the overbend by successive steps, gaging first from one side and then from the other. The more steps the less will be the residual unbalanced stress. By applying the measurement method above described a few reverse bendings of graduated amounts would produce substantially the same result, and greatly improve the stability of shape of such articles as shafts, including engine crankshafts, oil well drill pipe, guns and rifle barrels, etc.

If a more accurate measurement of the straightness of member 1 in Fig. 2 is necessary, so that the deflection of the press bed and the support blocks is not involved, the deflection gage may be of the form indicated in Fig. 4. This represents an instrument as disclosed in my copending application Serial No. 523,159, filed February 19, 1944, for measuring the average radius of curvature between H and J by means of the four wire gages 15 and 15' applied to a flexible beam to which is attached three knife edges or contacts as shown at H, J and K. By resting such an instrument on an accurate surface plate, the condition of balance of the gages may be determined. Slight spring pressure from any convenient clamps or external support at H, K and J contact the knife edges which are obviously of a character as not to indent the surface on which they lie.

Two such radius of curvature gages may be used simultaneously at 90 degrees to each other in which case any side bending of the shaft during straightening may be noted and corrected by further operation. In case the shaft is to be bent to a desired radius instead of to a straight, gages of the same character may be provided. This case occurs in various knife bending machines.

It will be apparent to anyone skilled in the art that there are many other practical applications that can be advantageously made of the principles of my invention. In fact, my invention applies to any case where it is desirable to utilize the offset from linearity in the relationship between two quantities, both of which can be made to change the impedance of corresponding electrical devices, the offset being obtained by opposing the outputs of the responsive devices so that substantially the output of the combination arises only as a result of the offset.

As another example of the application of my invention, I have provided an improved stress-strain recording or indicating device in which the conventional plot of stress against strain, as typified by Fig. 5a is replaced by the well-known plot or indication showing only the deviations from the modulus line 16, this having heretofore been made by tedious calculations and manual plotting. The resulting plot is illustrated in Fig. 5b, where the "strain" is the deviation referred to shown on an enlarged scale. A particular advantage of such a plot as that shown in Fig. 5b lies in the great ease with which the proportional limit 17 can be determined, as compared with that in Fig. 5a. In existing stress-strain procedure the accuracy of the plot of Fig. 5a has to be exceedingly high or the scale very large in order to afford the desired accuracy. With my method the accuracy of plot, Fig. 5b, need not be excessive and the desired information is available at a glance. In fact, for many applications, a simple indicating meter will suffice for observing the essential data.

To illustrate one means for accomplishing the desired result, I have shown in Figs. 6 and 7 a convenient means for varying the strain of a specimen or member 18. A weigh bar member 19 is provided to measure load and as is customary this member is made sufficiently large so that it operates at all times within its elastic range while the specimen 18 is under test even to the point of destruction. Member 19 may be made of any desired elastic material and may be adapted to carry the load on member 18, as shown in Fig. 6, or it may be of the same material as and integral with 18, as shown in Fig. 6a. For convenience, I have shown strain gages 20 of the form disclosed in Ruge Patent No. 2,316,975, although any other convenient electrically sensitive gages may be employed equally well. Bonded wire strain gages a, b, c, d, e, f, g, h are the sensitive elements. These gages, as shown in Fig. 7, are connected in circuits and control certain mechanisms for producing a stress-strain diagram of the type shown in Fig. 5b. The sensitive elements (a—d) of Fig. 6 are connected into a "strain bridge" and the other elements (e—h) into a "stress bridge." A suitably guided platen 21 is driven in the direction of the stress axis by a motor 22 and screw 22', the motor being actuated through an amplifier 23 by the unbalance of a circuit 26. A suitably guided pen arm 24 is driven vertically in the direction of the strain axis by motor 25 and a screw 25', the motor being actuated through an amplifier 28 by the unbalance of a circuit 27. The rotatable screws 22' and 25' are threaded in nuts fixed in the pen arm and platen. A pair of potentiometers 29 and 30, actuated by motion of platen and pen arm respectively through contact arms 29' and 30' formed on members 21 and 24, provide voltages opposing the unbalance voltage set up by the stress and strain bridges. When either circuit 26 or 27 is unbalanced, the corresponding amplifier actuates its motor so as to restore the condition of balance; in doing so, the pen or stylus plots a stress-strain diagram of the type shown in Fig. 5b as the loading progresses.

While the output of the stress bridge controls the platen motion directly, it is to be observed that the pen arm 24 is controlled by a signal resulting from the opposition of selected fractions of the unbalanced voltages of the stress and strain bridges. A pair of adjustable contacts 31 and 32 permit arbitrary selection of the relative magnitudes of the opposing voltages. Thus it is easily seen that I can adjust the contacts 31 and 32 so that pen arm 24 does not move while member 18 of Fig. 6a is stressed within its linear range, and that this arm will only move as a result of departure from linearity in the relation between stress and strain. Bridge balancing adjustments 33 and 34 provide balance adjustment of the bridges independent of the proportionality adjustments 31 and 32. In place of the stress-strain recorder shown I may employ a simple deviation indicator, as suggested before, when a plot is not required; in this event, circuit 26 is eliminated and circuit 27 terminates in a galvanometer or other suitable indicator instead of in potentiometer 30.

The opposed bridge circuit 26 per se is an invention of Arthur C. Ruge employed by him in a spring tester apparatus. The circuit is employed here for purposes of illustration as one means to carry out a detail of my invention. It will be clear that I could equally well use the circuit of Fig. 3 by making gage element 4 responsive to stress and gage element 4' responsive to strain. While many other equivalent circuits might be employed, yet the present disclosure serves to illustrate means for obtaining independent adjustment of zero balance and of the ratio of the two essential measurements involved.

As Ruge has shown in his spring tester disclosure, the "spring stiffness" or modulus of elasticity of specimen 18 can be read off directly from the settings of contacts 31 and 32 once the linearity balance condition is set up. Thus, the slope of the modulus line 16 of Fig. 5a can be read from a calibrated dial by leaving one adjustment, say 31, fixed, and providing a calibrated scale for adjustment 32 expressed in terms of modulus of elasticity.

From the disclosure herein it is seen that the various embodiments of my invention whether they relate to shaft straightening or recording can be broadly identified as apparatus for automatically indicating or determining deviations from proportionality between displacement of the material and the force incident to such displacement. This force may be considered broadly herein as including stress, torque and loading force while the displacement will be broadly considered as strain per se and deflection. Strain is an actual incremental displacement within the material itself produced by load applied to the material in the same way that deflection is a displacement of the material induced by a load applied thereto. My improved apparatus provides an automatic means for indicating the occurrence, as well as the extent, of deviation from proportionality in a simple, direct and effective manner and which can be operated with ease, dispatch and precision without the need of any mental calculation or manual plotting.

It will of course be understood that various changes in details of construction and arrangement of parts may be made by those skilled in

I claim:

1. Apparatus for straightening a bent member comprising, in combination, means for supporting the bent member at two points which allow the member to be turned approximately 180° and which support the member during deflection thereof to straighten the same, strain means electrically responsive to displacement of the member when turned, thereby to determine the extent of misalignment of the member and consequently the extent to which it is necessary to bend the member in the opposite direction of the misalignment in order to straighten the same, means for applying a straightening load to the member, electrical strain responsive means connected to said load applying means for determining the applied load, and electrical means controlled by said strain means that is electrically responsive to displacement of the member and by said load applying means for indicating when the bent member has been sufficiently deflected in said opposite direction so that upon release of the straightening load the member will assume a position of substantial alignment.

2. The combination set forth in claim 1 further characterized in that the displacement responsive means comprises a bending beam having one end fixed and the other end bearing against the underside of the member and the load straightening means is positioned to engage the member on the upper side thereof opposite to said bending beam.

ALFRED V. DE FOREST.

REFERENCES CITED

The following references are of record in the file of this patent:

UNITED STATES PATENTS

| Number | Name | Date |
|---|---|---|
| 2,346,981 | Manjoine et al. | Apr. 18, 1944 |
| 2,356,763 | Keinath | Aug. 29, 1944 |
| 2,252,464 | Kearns, Jr., et al. | Aug. 12, 1941 |
| 2,316,975 | Ruge | Apr. 20, 1943 |
| 2,361,173 | Browne, Jr. | Oct. 24, 1944 |